(12) United States Patent  (10) Patent No.: US 9,113,304 B1
Ramaswamy et al.  (45) Date of Patent: Aug. 18, 2015

(54) LOCALIZATION OF DEVICE AT REST

(71) Applicant: Amazon Technologies, Inc., Reno, NV (US)

(72) Inventors: Sharadh Ramaswamy, Sunnyvale, CA (US); K R Suveetha Kamatchi, Tamil Nadu (IN)

(73) Assignee: Amazon Technologies, Inc., Reno, NV (US)

( * ) Notice: Subject to any disclaimer, the term of this patent is extended or adjusted under 35 U.S.C. 154(b) by 38 days.

(21) Appl. No.: 13/710,074

(22) Filed: Dec. 10, 2012

(51) Int. Cl.
 *H04W 24/00* (2009.01)
 *H04W 4/02* (2009.01)
 *H04W 64/00* (2009.01)

(52) U.S. Cl.
 CPC .............. *H04W 4/025* (2013.01); *H04W 4/027* (2013.01); *H04W 64/00* (2013.01)

(58) Field of Classification Search
 CPC ...... H04W 64/00; H04W 4/025; H04W 4/027
 USPC ...................... 455/456.1, 456.2, 404.2, 456.6
 See application file for complete search history.

(56) References Cited

U.S. PATENT DOCUMENTS

| | | | |
|---|---|---|---|
| 8,571,539 B1 * | 10/2013 | Ranganathan et al. | 455/419 |
| 2009/0298469 A1 * | 12/2009 | Kim et al. | 455/411 |
| 2010/0188243 A1 * | 7/2010 | Tysowski et al. | 340/669 |
| 2011/0234543 A1 * | 9/2011 | Gardenfors et al. | 345/175 |
| 2012/0196571 A1 * | 8/2012 | Grkov et al. | 455/411 |
| 2012/0252495 A1 * | 10/2012 | Moeglein et al. | 455/456.3 |
| 2013/0040600 A1 * | 2/2013 | Reitnour et al. | 455/404.2 |
| 2014/0125700 A1 * | 5/2014 | Ramachandran et al. | 345/633 |

* cited by examiner

*Primary Examiner* — Barry Taylor
(74) *Attorney, Agent, or Firm* — Lowenstein Sandler LLP

(57) ABSTRACT

A method for assisting in the recovery of a lost electronic device is described. When an electronic device determines that it is at rest, it automatically captures an image using a built-in camera and transmits the image to a server. A user, having lost the electronic device, may access the image via a web interface to determine the location of the electronic device.

21 Claims, 4 Drawing Sheets

LOCALIZATION OF DEVICE AT REST

BACKGROUND

A large and growing population of users enjoys entertainment through the consumption of digital media items, such as music, movies, images, electronic books and so on. Users employ various electronic devices to consume such media items. Among these electronic devices are electronic book readers, cellular telephones, personal digital assistants (PDAs), portable media players, tablet computers, netbooks and the like. A typical problem that users of small, portable electronic devices face is that they often misplace them.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only. Further, it should be understood that the drawings are not necessarily proportional or to scale.

DETAILED DESCRIPTION

Embodiments of a method for assisting in the recovery of a lost electronic device are described. The method includes using onboard sensors to determine if the device is at rest and, when it is so determined, transmitting an image taken by an onboard camera so that a user can view the image and determine the location of the device.

In one embodiment, GPS (Global Positioning System) coordinates are also transmitted with the image to assist the user in locating the device. Whereas GPS coordinates alone may provide a general vicinity of the device, e.g., an address, the image further assists the user in determining the specific location of the device. For example, the image may indicate in what room the device is located or whether the device has fallen behind a particular piece of furniture.

Figure 1:
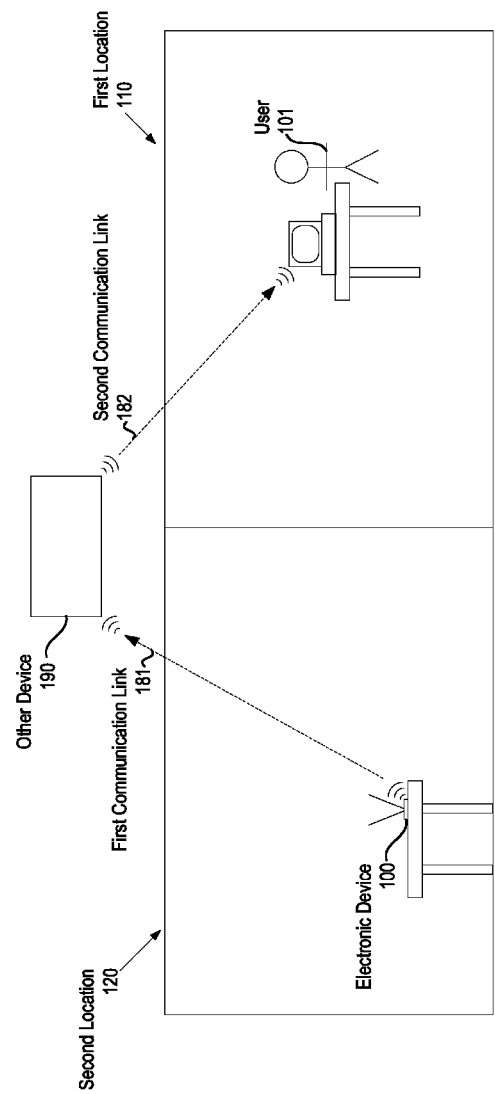
FIG. 1 illustrates an application of a method of recovering a lost electronic device 100.

FIG. 1 illustrates an application of a method of recovering a lost electronic device 100. FIG. 1 illustrates a user 101 in a first location 110 that has inadvertently left an electronic device 100 in a second location 120.

The electronic device 100 includes sensors to determine whether the electronic device 100 is at rest, as described in detail below with respect to FIG. 2. The electronic device 100 further includes a camera and when it is determined that the electronic device 100 is at rest, the electronic device 100 takes a picture of the second location 120 using the camera. The electronic device 100 transmits the image from the second location 120 to the first location 110 where it can be seen by the user 101. In one embodiment, the image is transmitted to another device (e.g., a server) 190 over a first communication link 181 that can be accessed by the user 101 via a second communication link 182. In one embodiment, the first communication link 181 is a wireless communication link and the second communication link is a wired communication link. In another embodiment, both communication links 181 and 182 are wireless communication links. For example, the image may be transmitted to an e-mail address of the user. In another embodiment, the image is accessed via a web interface, as illustrated below in FIG. 4.

The user 101 can access the image to assist in recovering the electronic device 100 when it is lost. For example, the user 101 can view the image of the second location 120, recognize the second location 120, and return to the second location 120 to retrieve the electronic device 100.

Figure 2:
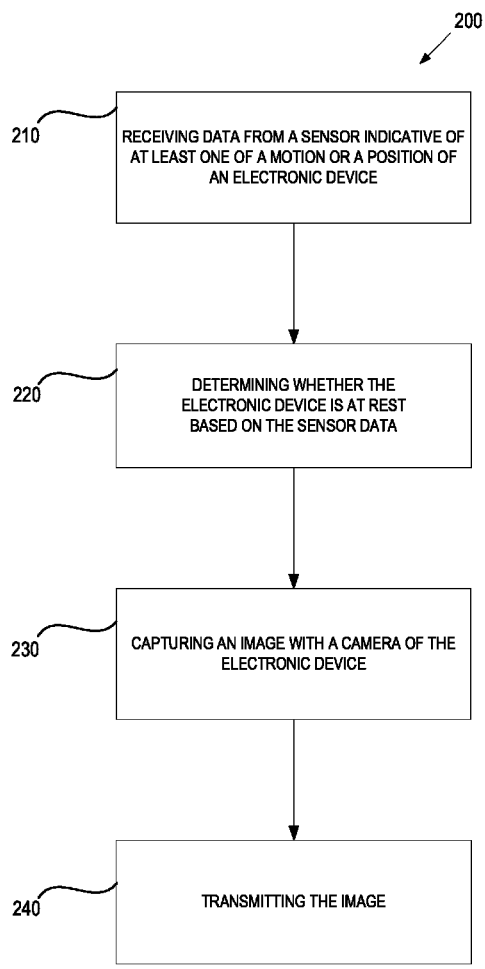
FIG. 2 illustrates a flowchart of an embodiment of a method of transmitting an image.

FIG. 2 illustrates a flowchart of an embodiment of a method 200 of transmitting an image. The method 200 begins, in block 210, with receiving data from a sensor indicative of at least one of a motion or a position of an electronic device. The data may be indicative of an absolute position, such as GPS coordinates provided by a GPS sensor. The data may be indicative of a relative position, such as distance to another object provided by a proximity sensor or orientation in space provided by an accelerometer. The data may be indicative of a motion, such as motion provided by a gyroscope or an accelerometer. The data may be received from more than one sensor. Further, other types of sensors may provide the data. For example, a light sensor, a camera, or a microphone may provide the data.

In block 220, it is determined whether the electronic device is at rest based on the sensor data. It may be determined whether the electronic device is at rest using a number of different definitions. For example, it may be determined that electronic device is at rest when data from a motion sensor indicates that the electronic device is stationary. As another example, it may be determined that the electronic device is at rest when data from a motion sensor indicates that the electronic device has not moved for a prescribed amount of time. The prescribed amount of time may be, e.g., ten seconds, one minute, five minutes, thirty minutes, one hour, or any other amount of time. It may be determined that the electronic device is at rest when data from an accelerometer indicates that the electronic device has been placed in a flat, face-up or face-down orientation. It may be determined that the electronic device is at rest when data from a proximity sensor indicates it has been set down against an object, e.g. a table. It may be determined that the electronic device is at rest when a user has not interacted with the device (e.g., via a touch screen or other input device) for a prescribed amount of time. The prescribed amount of time may be, e.g., ten seconds, one minute, five minutes, thirty minutes, one hour, or any other amount of time. It may be determined that the electronic device is at rest when a media application or other application is not in use. The above factors may be combined in a variety of ways to determine whether or not the electronic device is at rest. Other factors may be used to determine whether the electronic device is at rest.

In block 230, if it is determined that the electronic device is at rest, an image is automatically (e.g., without user interaction) captured by a camera of the electronic device. In one embodiment, the electronic device includes a front-facing camera (disposed on a first side of the electronic device) and a rear-facing camera (disposed on a second side of the electronic device opposite the first side). In one embodiment, an image is captured with both the front-facing camera and the rear-facing camera. In another embodiment, an image is captured with only one of the front-facing camera and the rear-facing camera. For example, data from an accelerometer may indicate that the electronic device is set face-down and, therefore, the image is captured with only the rear-facing camera. Alternatively, data from the accelerometer may indicate that the electronic device is set face-up and the image is captured with only the front-facing camera.

In block 240, the image is transmitted. The image may be transmitted immediately after and in response to capturing the image or may be transmitted at a later time. In one embodiment, the image is wirelessly transmitted to another device that can be accessed by the user. In one embodiment, the image is wireless transmitted to a server that can be accessed by the user over a network. For example, the image may be transmitted to an e-mail address of the user. In another embodiment, the image is transmitted directly to another electronic device, such as a tablet, laptop, desktop, secondary phone, etc. In one embodiment, the image is transmitted in response to receiving a request to transmit the image. For example, a user may login via a web interface and request the image.

In one embodiment, once it is determined that the electronic device is at rest, the method 200 waits a prescribed period of time before capturing and transmitting the image. If the electronic device is still at rest at the end of the prescribed period of time, the image is captured and transmitted. The prescribed period of time may be ten seconds, one minute, five minutes, thirty minutes, one hour, or any other period of time. This delay prevents an image from being captured when a device is simply set down, but not lost, saving battery power which would be used taking unnecessary images. In another embodiment, the method 200 waits for a low-battery state before capturing and transmitting the image. If the electronic device is still at rest when the low-battery state occurs, the image is captured. A low-battery state may be determined when the battery power is less than a certain percentage of the total battery power. The percentage may be 50%, 33%, 25%, 10%, 5%, or any other percentage. Thus, the image is captured (and transmitted) before the electronic device shuts-off from lack of power.

The image may be transmitted with additional information that may assist the user in determining the location of the electronic device. The image may be transmitted with a brief sound recording captured when the image is taken. The image may be transmitted as part of or accompanying a captured video recording. The image may be transmitted with sensor data. For example, the image may be transmitted with as GPS coordinates from a GPS sensor. The image may be transmitted with an indication of the orientation of the electronic device from an accelerometer. The image may be transmitted with a proximity sensor state. The image may be transmitted with other information related to the location of the electronic device.

The image may be transmitted with additional information unrelated to the location of the electronic device. For example, the image may be transmitted with an indication of battery power. The image may be transmitted with an indication and information about missed calls. The image may be transmitted with other information.

Figure 3:
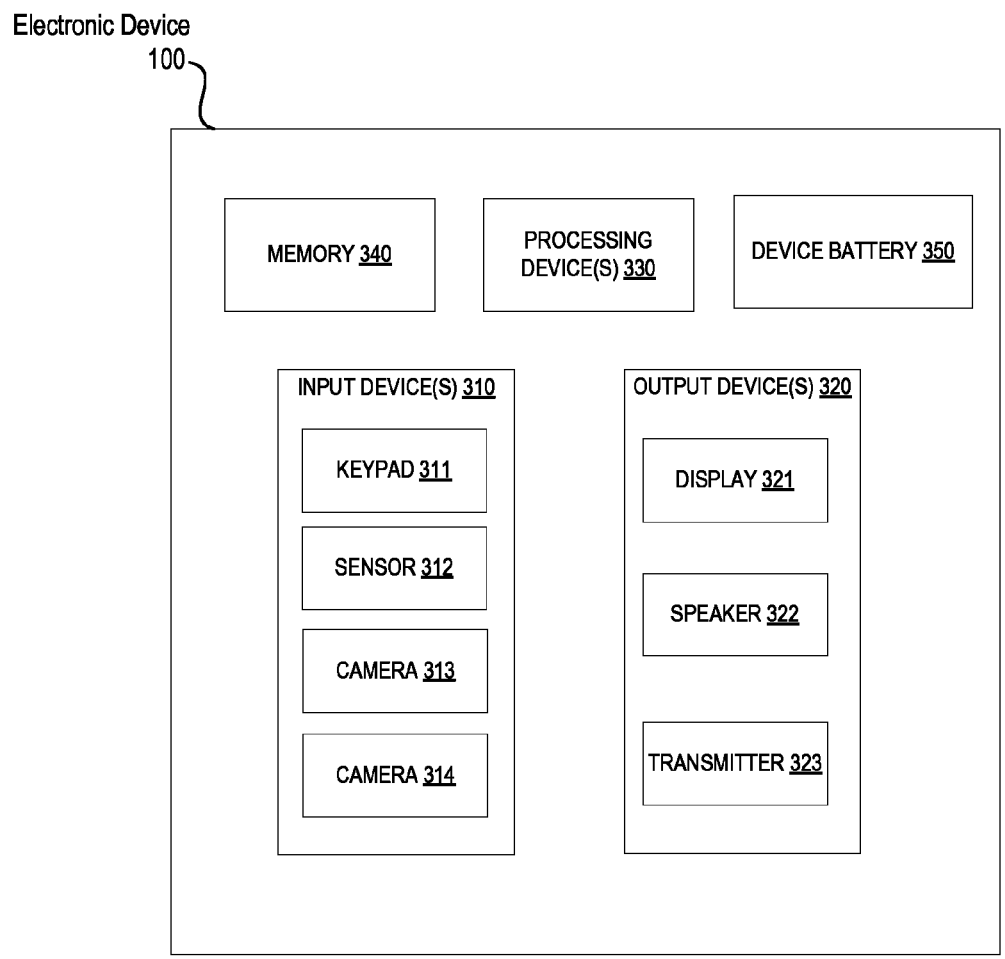
FIG. 3 illustrates a functional block diagram of an embodiment of an electronic device.

FIG. 3 illustrates a functional block diagram of an embodiment of an electronic device 100. The electronic device 100 may be any type of computing device such as an electronic book reader, a PDA, a mobile phone, a laptop computer, a portable media player, a tablet computer, a smart phone, a camera, a video camera, a netbook, a desktop computer, a gaming console, a digital video disc (DVD) player, a computing pad, a media center, and the like.

The electronic device 100 includes various components coupled via one or more buses (not shown). The electronic device 100 includes one or more processing devices 330, such as one or more central processing units (CPUs), microcontrollers, field programmable gate arrays, or other types of processing devices. The electronic device 100 also includes device memory 340, in data communication with the processing devices 330, which may correspond to any combination of volatile and/or non-volatile storage devices. The device memory 340 may include one or more of read-only memory (ROM), flash memory, dynamic random access memory (DRAM) such as synchronous DRAM (SDRAM)), and static random access memory (SRAM)). The device memory 340 stores information which provides an operating system component, and various program modules. The electronic device 100-performs functions by using the processing device(s) 330 to execute instructions provided by the device memory 340. The system memory 340 may include one or more types of removable storage and/or one or more types of non-removable storage. The system memory 140 may include a computer-readable storage medium on which is stored one or more sets of instructions embodying any one or more of the methodologies or functions described herein.

The electronic device 100 may also include one or more input devices 310, such as a keypad 311. The input devices 310 may further include a keyboard, a mouse device, specialized selection keys, sensors, wireless receivers or other input devices. The input devices 310 may include one or more sensors 312. The sensor 312 may include a sensor that provides information indicative of at least one or a position or a motion of the electronic device 100. The sensor 312 may include a proximity sensor, a GPS sensor, an accelerometer, or a gyroscope. The sensor 312 may include other types of sensors. For example, the sensor 312 may include a heat sensor, a light sensor, or any other sensor. The input devices 310 may include a plurality of cameras 313, 314. The camera 313 may include a lens that focuses an image onto an image sensor. When a user selects the image for storage via one of the input devices 310, the image focused onto the light sensor is stored in the memory 340. The image sensor may be, for example, a charge-coupled device (CCD). The image sensor 256 may be another kind of sensor for detecting an image.

The electronic device 100 may also include one or more output devices 320, such as a display 321. The output devices 320 may include displays, printers, audio output devices (such as a speaker 322), or other output devices. The output devices 320 may include a transmitter 323 that wireless transmits data. In one embodiment, a single device (e.g., a touch screen) may be both an input device 310 and an output device 320.

The electronic device 100 includes a battery 350 for providing power to the various other components of the electronic device 100. The device battery 350 may a rechargeable or a non-rechargeable battery. The device battery 350 may include an interface for connecting to an external power supply to recharge the device battery 350. The processing device 330 may determine a charge level of the battery 350.

The electronic device 100 may be configured to perform a method of transmitting an image when it is determined that the electronic device 100 is at rest in order to assist a user in determining the location of the electronic device 100. The electronic device 100 may be configured to, for example, perform an embodiment of the method 200 of FIG. 2.

Figure 4:
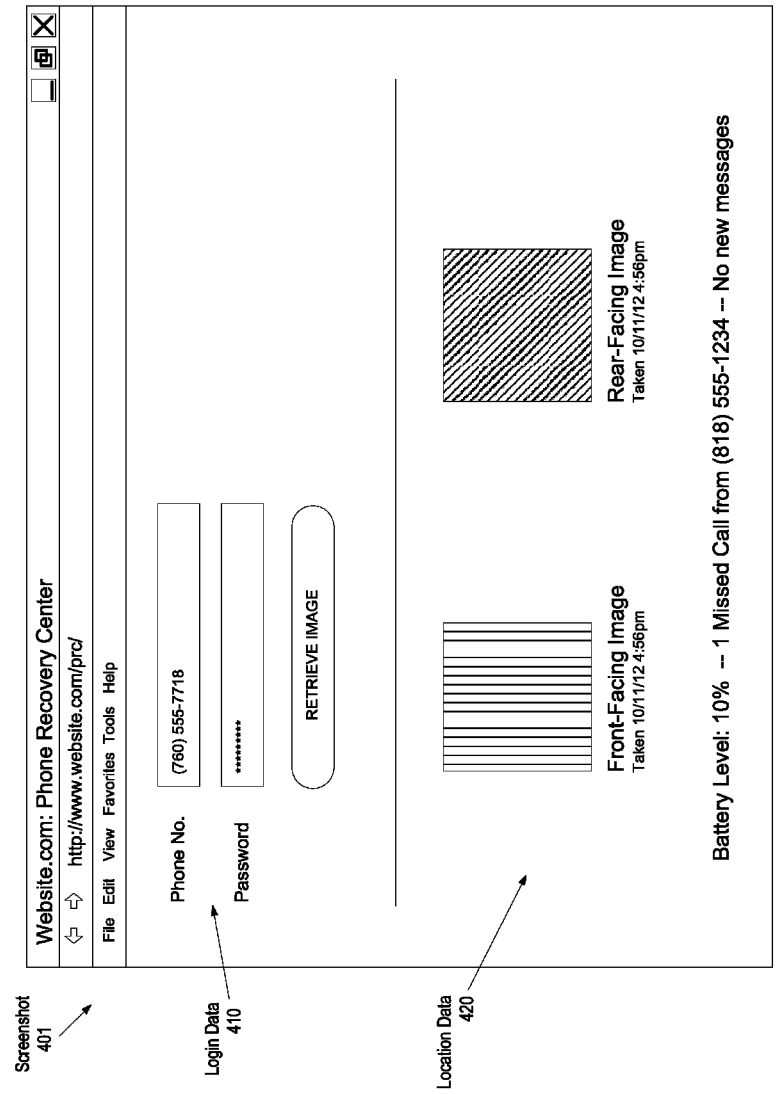
FIG. 4 illustrates an embodiment of a web interface for determining the location of an electronic device.

FIG. 4 illustrates an embodiment of a web interface for determining the location of an electronic device. The exemplary screenshot 401 illustrates a first portion of a web interface in which a user enters login data 410 and illustrates a second portion of a web interface in which a user receives location data 420. The login data 410 may include a phone number, a username, a password, or other information identifying a user or associated with an electronic device. The login data 410 may further include a button to retrieve the location data 420.

The location data 420 may be presented to a user over the web interface in response to receiving the login data 410. The location data 420 may include at least one of an image from a front-facing camera of the electronic device and an image from a rear-facing camera of the electronic device. The location data 420 may indicate a time at which each image was taken. The location data 420 may also indicate other information about the electronic device, such as a battery level, information regarding missed calls, or a number of messages.

In one embodiment, the location data 420 is retrieved from the electronic device in response to a user entering the login data 410. This may be possible when the electronic device is powered on. Thus, in response to receiving the login data 410 via the web interface, location data 420 is retrieved from the electronic device (which may include capturing an image at that time) and presented via the web interface.

In another embodiment, the location data 420 is received prior to a user entering login data 410. The location data 420 can be stored and presented via the web interface in response to the user entering login data 410. Thus, the user can retrieve the location data 420 even when the device is powered off, e.g., if battery power has run out, or if the device does not have wireless coverage. In one embodiment, the location data 420 is received prior to a user entering login data 410 and (if the electronic device is powered on and has wireless data reception) updated location data 420 is retrieved from the electronic device in response to the user entering login data 410.

As noted above, because consumers desire small devices, they may misplace them. The web interface and associated system may assist recovery of lost devices by using the onboard sensors, such as inertial sensors or a camera. The system may be of particular use indoors, where GPS signals may not be able to be determined or may not be accurate enough to locate the device. The system may also be of particular use when the device is in a lower-power or no-power state (or in a silent mode), as a user may be unable to call or otherwise ping the device to determine its location. Thus, in one embodiment, when a device is at rest it captures an image with at least one of a front-facing or rear-facing camera and sends the image to a server or another device. The image may be accessed via a web interface and the user of the device can use the last captured set of images to determine where the device is located and retrieve the device.

As mentioned above, the device may include more than one camera (e.g., a front-facing camera and a rear-facing camera). In embodiments, the device may include more than one camera disposed on the same side of the device (e.g., two or more front-facing cameras or two or more rear-facing cameras). Two or more cameras (either disposed on the same side or opposite sides) may be used for depth perception since the same object of interest (e.g. a ceiling fan) would be translated when viewed from the two stereo cameras. The further the object of interest is from the cameras, the less it appears to move between the images taken with the different cameras. With information regarding the camera intrinsics (focal length), the depth in (meters/cm/mm) can be calculated. This can be used to determine, for example, the distance from the device to the ceiling, further assisting a user locate the device when presented with this information, e.g., via the web interface.

The foregoing description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth here are merely exemplary. Particular implementations may vary from these exemplary details and still be contemplated to be within the scope of embodiments of the present invention.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

It is to be understood that the above description is intended to be illustrative and not restrictive. Many other embodiments will be apparent to those of skill in the art upon reading and understanding the above description. The scope of the present invention should, therefore, be determined with reference to the appended claims, along with the full scope of equivalents to which such claims are entitled.

What is claimed is:

1. A method comprising
   receiving, by a processor, data from an accelerometer indicative of at least one of a motion or position of an electronic device;
   determining that the electronic device is in a face-up or a face-down orientation based, at least in part, on the data from the accelerometer;
   determining that the electronic device is at rest based, at least in part, on the data from the accelerometer;
   in response to determining that the electronic device is at rest and that the electronic device is in the face-up orientation, capturing a first pair of images with a pair of front-facing cameras disposed on a first side of the electronic device or, in response to determining that the electronic device is at rest and that the electronic device is in the face-down orientation, capturing a second pair of images with a pair of rear-facing cameras disposed on a second side of the electronic device opposite the first side;
   computing a distance to an object represented in at least one of the first pair of images or the second pair of images based at least in part on a focal length of at least one of the pair of front-facing cameras or the pair of rear-facing cameras; and
   transmitting information comprising at least one image of the first pair of images or the second pair of images to a server for access by a user to assist in recovering the electronic device, wherein the information further comprises an indication of the distance.

2. The method of claim 1, wherein the received data comprises data indicative of at least one of an amount of motion of the electronic device or an orientation of the electronic device.

3. The method of claim 1, wherein determining that the electronic device is at rest comprises determining that the electronic device is stationary.

4. An electronic device comprising
   a plurality of cameras comprising a pair of cameras on a same side of the electronic device;
   a sensor configured to generate data indicative of at least one of a motion or position of the electronic device;
   a transmitter configured to transmit information; and
   a processor configured to:
      receive the data from the sensor;

determine that the electronic device is at rest based, at least in part, on the data from the sensor;

capture a pair of images with the pair of cameras;

compute a distance to an object represented in the pair of images based at least in part on a focal length of the pair of cameras; and transmit information comprising at least one image of the pair of images via the transmitter, wherein the information further comprises an indication of the distance.

5. The electronic device of claim 4, wherein the sensor comprises at least one of a proximity sensor, an accelerometer, or a gyroscope.

6. The electronic device of claim 4, wherein the sensor comprises a global positioning system (GPS) sensor and wherein the information transmitted by the processor via the transmitter further comprises GPS coordinates.

7. The electronic device of claim 4, wherein the processor is configured to determine that the electronic device is at rest by determining that the received data indicates that the electronic device is stationary.

8. The electronic device of claim 4, wherein the processor is configured to determine that the electronic device is at rest by determining that the received data indicates that the electronic device has not moved for at least a prescribed period of time.

9. The electronic device of claim 4, wherein the processor is configured to determine that the electronic device is at rest by determining that the electronic device has not been accessed by a user for at least a prescribed period of time.

10. The electronic device of claim 4, wherein the processor is configured to wait a prescribed period of time between determining that the electronic device is at rest and capturing the pair of images.

11. The electronic device of claim 4, wherein the plurality of cameras comprises a front-facing camera disposed on a first side of the electronic device and a rear-facing camera disposed on a second side of the electronic device opposite the first side.

12. The electronic device of claim 4, wherein the processor is configured to transmit the at least one image to a server.

13. The electronic device of claim 4, wherein the processor is configured to capture the pair of images in response to determining a low-battery condition of the electronic device.

14. The electronic device of claim 4, wherein the processor is configured to transmit the at least one image in response to capturing the at least one image.

15. The electronic device of claim 4, wherein the information transmitted by the processor via the transmitter further comprises an indication of battery power.

16. The electronic device of claim 4, wherein the processor is configured to transmit the at least one image in response to a request from a user.

17. The electronic device of claim 4, wherein the information further comprises an indication of a missed call.

18. A non-transitory computer-readable storage medium having instructions thereon which, when executed by a processing device, causes the processing device to perform operations comprising:

determining, by the processing device, that an electronic device is in a face-up or a face-down orientation;

determining that the electronic device is at rest;

generating a pair of images using a pair of rear-facing cameras;

computing a distance to an object represented in the pair of images based at least in part on a focal length of the pair of rear-facing cameras; and transmitting at least one image of the pair of images and an indication of the distance.

19. The non-transitory computer-readable storage medium of claim 18, wherein determining that the electronic device is at rest is based, at least in part, on data indicative of at least one of a proximity of the electronic device to another object, an amount of motion of the electronic device, an orientation of the electronic device, or global position system (GPS) coordinates of the electronic device.

20. The non-transitory computer-readable storage medium of claim 18, further comprising capturing the pair of images in response to determining that the electronic device is at rest.

21. The non-transitory computer-readable storage medium of claim 18, wherein the operations further comprise transmitting an indication of a missed call.

* * * * *